United States Patent [19]

Miller

[11] Patent Number: 4,651,954

[45] Date of Patent: Mar. 24, 1987

[54] AUTOTHROTTLE SYSTEM

[75] Inventor: John W. Miller, Smyrna, Ga.

[73] Assignee: Lockheed Corporation, Calabasas, Calif.

[21] Appl. No.: 673,192

[22] Filed: Nov. 19, 1984

[51] Int. Cl.$^4$ .............................................. B64C 17/00
[52] U.S. Cl. .................................. 244/76 R; 74/89.21; 74/491; 244/234
[58] Field of Search ................... 244/76 R, 76 B, 182, 244/234, 196, 197; 123/339; 74/625, 491, 89.21

[56] References Cited

U.S. PATENT DOCUMENTS

| | | | |
|---|---|---|---|
| 3,599,510 | 8/1971 | Scott et al. | 244/234 |
| 4,082,007 | 4/1978 | Strickland | 74/89.21 |
| 4,093,158 | 6/1978 | Clews et al. | 244/182 |
| 4,237,833 | 12/1980 | Des Lauriers | 123/339 |

Primary Examiner—Galen Barefoot
Assistant Examiner—Mark R. Valliere
Attorney, Agent, or Firm—Eric R. Katz

[57] ABSTRACT

An autothrottle system for an aircraft includes a throttle lever actuator which is easily retrofitted to an existing throttle quadrant and employs a D.C. stepping motor to slew the throttle levers and eliminate the need for a feedback loop.

8 Claims, 7 Drawing Figures

SIDE VIEW FORWARD

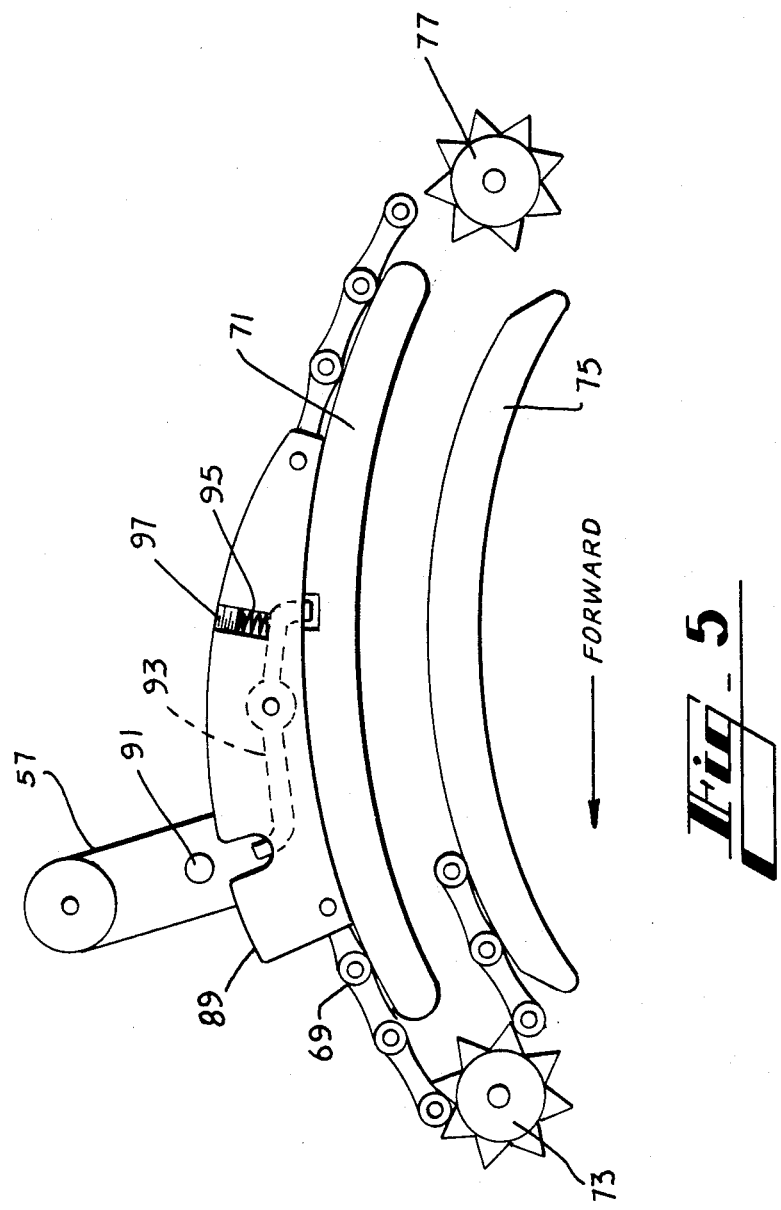

AUTOTHROTTLE SYSTEM

TECHNICAL FIELD

The present invention generally relates to an autothrottle system for an aircraft to control throttle settings and, more particularly, to an autothrottle unit which is easily retrofitted to an existing throttle quadrant to provide automatic actuation and slewing of one or more throttle levers.

BACKGROUND OF THE INVENTION

A control system is, typically, a closed-loop system that depends upon the feedback concept for operation. Conventionally, the output or controlled parameter is forced to be a function of the reference input, where the reference input is, in general, an arbitrary function of time.

One example of a control system is the conventional automatic throttle control or, more simply, the autothrottle. Essentially, an autothrottle provides automatic control of the throttles of, for example, an aircraft and, in this application, is employed, for example, during climb, descent, cruise, and landing approaches to significantly reduce pilot workload. Additionally, because, at high altitudes, throttle settings are the most important consideration in fuel savings, an autothrottle can reduce fuel consumption and thus increase the range of the aircraft.

Customarily, the autothrottle utilizes airspeed as the basic control parameter: although other parameters, such as rate-of-climb or angle of attack, can be used. Known autothrottles typically comprise a main controller which provides an airspeed command which is compared with the actual airspeed measured by the airspeed indicator. Using the feedback concept, an airspeed error signal is generated and provided back to the controller. Also inputted to the controller are signals indicative of pitch attitude as from a gyroscope, longitudinal acceleration from an accelerometer, and airspeed rate as from an airdata sensor. Based on these inputs, the controller generates a command signal which is provided to an electronically controlled A-C motor operated as a position servo. This servo is connected in parallel with the throttle levers and engine controls through a drum type friction clutch pack. Using feedback control, the throttle levers are set in accordance with the command signal.

Because the typical autothrottle is installed at the time of construction of the aircraft, the autothrottle generally includes a centrally located console from which the pilot selects the desired throttle modes, accomplishes throttle servo engagement/disengagement, and inserts airspeed commands into the system. Location of these functions on the aircraft's control wheel provides a degree of pilot relief and is the standard configuration.

While operationally quite efficient, known autothrottle systems do not lend themselves to application to an aircraft after the construction thereof has been completed. Considerable modification to the aircraft is required to apply the autothrottle components which require a considerable amount of time and effort and results in an increased cost of the overall system. Additionally, the feedback concept employed by known autothrottle systems increases the opportunity for signal errors which can result in the improper functioning of the system.

DISCLOSURE OF THE INVENTION

It is, therefore, an object of the present invention to provide an autothrottle system for the automatic operation of one or more throttle levers, the autothrottle system being easily retrofitted to an aircraft initially constructed without autothrottle capabilities.

Another object of the present invention is to provide an autothrottle system that eliminates the need for feedback loops in order to function.

Yet another object of the present invention is to provide a throttle lever actuator for slewing one or more throttle levers, the actuator being easily installed on the existing throttle quadrant of the aircraft.

Still another object of the present invention is to provide an autothrottle system having a relatively low cost and suitable for field installation.

One important feature of the present invention is the provision of an emergency capability which allows a pilot to override a selected throttle lever or plurality of levers for immediate manual operation of any or all engines as well as permitting the repositioning of any of the throttle levers for subsequent automatic operation.

Another feature of the present invention is the provision of a throttle lever actuator which utilizes a single D.C. stepping motor for slewing the throttle levers, the stepping motor eliminating the need for a position feedback loop.

Still a further important feature of the present invention is the provision of an autothrottle system adapted to function only during flight operation.

An important feature and significant advantage of the present invention is the provision of an autothrottle system adapted to accomplish a desired power setting automatically utilizing a variety of different control information including airspeed.

In accordance with these and other advantages, objects and features of the present invention, there is provided an autothrottle system for an aircraft having a pitch attitude gyroscope for providing a pitch attitude output signal, a throttle quadrant having at least one throttle lever, and an airspeed indicator. The system utilizes an airspeed command generator for inputting a desired airspeed setpoint and for generating an airspeed error signal proportional to the difference between the actual airspeed as measured by the airspeed indicator and the desired airspeed setpoint. The system also includes a longitudinal accelerometer mounted in the aircraft for measuring acceleration in the fore and aft direction of the aircraft's principal body axis. The longitudinal accelerometer provides an output signal proportional to the longitudinal acceleration of the aircraft. A controller receives the airspeed error signal, the pitch attitude output signal, and the longitudinal acceleration output signal and generates, based on the control laws for the aircraft, a throttle setting command signal. A throttle lever actuator positions at least one of the throttle levers in accordance with the throttle setting command signal.

In accordance with the present invention, the airspeed command generator comprises a manually operated command bug which is actuated by a knob to permit a pilot to set a desired airspeed, the airspeed error signal being determined by the difference between the airspeed pointer of the airspeed indicator and the manually set command bug.

Further, in accordance with the principles of the present invention, when the aircraft experiences a positive pitch angle, the gravitational force on the longitudinal accelerometer is interpreted as a forward acceleration; however, since no reduction in power is desired due to the pitch-up alone, a compensating signal from the pitch attitude gyroscope is provided to the controller.

In accordance with the present invention when the aircraft is provided with a built-in autothrottle, then the pitch attitude output signal is provided by the autothrottle attitude gyroscope and this element is eliminated as a component of the autothrottle system of the present invention.

In accordance with the present invention, the throttle lever actuator comprises a low profile housing having slots for accommodating the throttle levers, the housing being adapted to fit on top of the existing throttle quadrant. Each individual throttle lever of the throttle quadrant is driven by a bicycle-type chain drive mechanism, each chain following the arc of a first curved support bar and passing down and around sprockets at the front and back of the curved bar. The ends of each of the chains are joined to form a continuous loop, the lower segment of the loop passing over a second curved bar concentric with first curved support bar. The front sprockets are idlers and the rear sprockets are idlers during manual throttle operation and are clutched to a drive shaft during autothrottle operation. The drive shaft is driven by a geared D.C. stepper motor. Engagement of the clutches and energizing of the motor are controlled by a lever conveniently located to the left of the throttles. A notched carrier attached to each chain engages a pin attached to the corresponding throttle lever throughout the throttle range from flight idle to maximum power. When a throttle is retarded aft of the flight idle position, its drive chain remains latched in the stand-by position until the throttle is returned to flight idle.

BRIEF DESCRIPTION OF THE DRAWINGS

FIG. 5 illustrates the locking arrangement of the throttle lever actuator when the throttle levers are moved to the ground operation position.

BEST MODE FOR CARRYING OUT THE INVENTION

Figure 1:
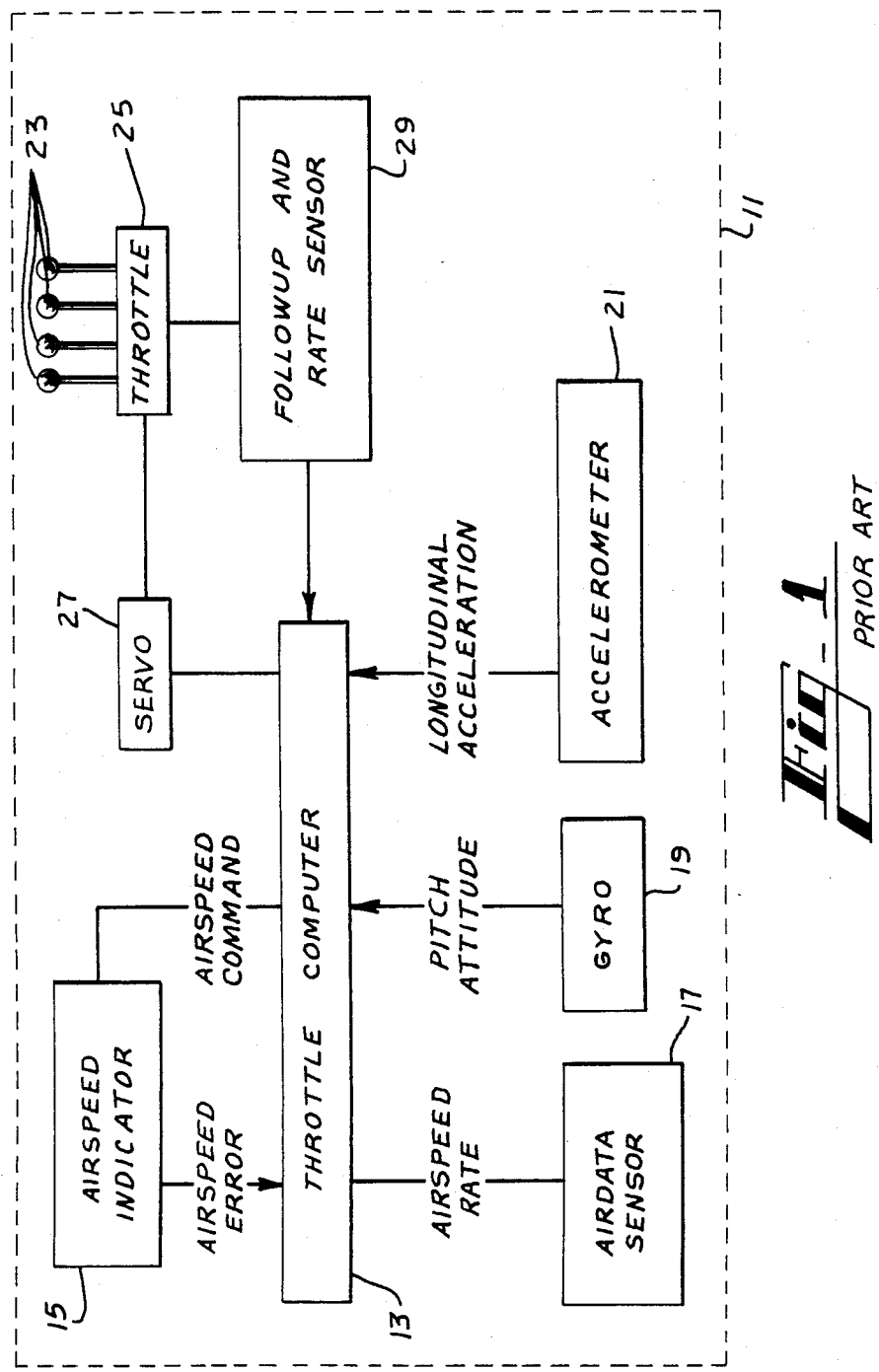
FIG. 1 is a block diagram illustrating a conventional autothrottle system utilizing the feedback concept for control.

FIG. 1 illustrates a conventional autothrottle system 11 comprising a centrally located throttle computer 13 from which the pilot selects the desired throttle modes, accomplishes throttle servo engagement/disengagement and inserts airspeed commands into the system. The computer generates an airspeed command which is compared with the actual airspeed as measured by the airspeed indicator 15. Using the feedback concept, an airspeed error signal is generated and inputted back to the throttle computer 13, this error signal being representative of the difference between the actual airspeed and the commanded airspeed.

Also inputted to the computer 13 are airspeed rate data as from an air data sensor 17, pitch attitude data as from a gyroscope 19, and longitudinal acceleration data as from an accelerometer 21. Utilizing the inputted data, computer 13 calculates the desired throttle setting and rate of throttle advancement.

Throttle levers 23 of throttle quadrant 25 are actuated by an electrically controlled A. C. motor 27 operated as a position servo. This servometer 27 is connected in parallel with the throttle levers 23 and engine controls through a drum type friction clutch pack. A follow-up and rate sensor 29 provides the feedback data to assist in the positioning of the levers using the feedback concept.

Figure 2:
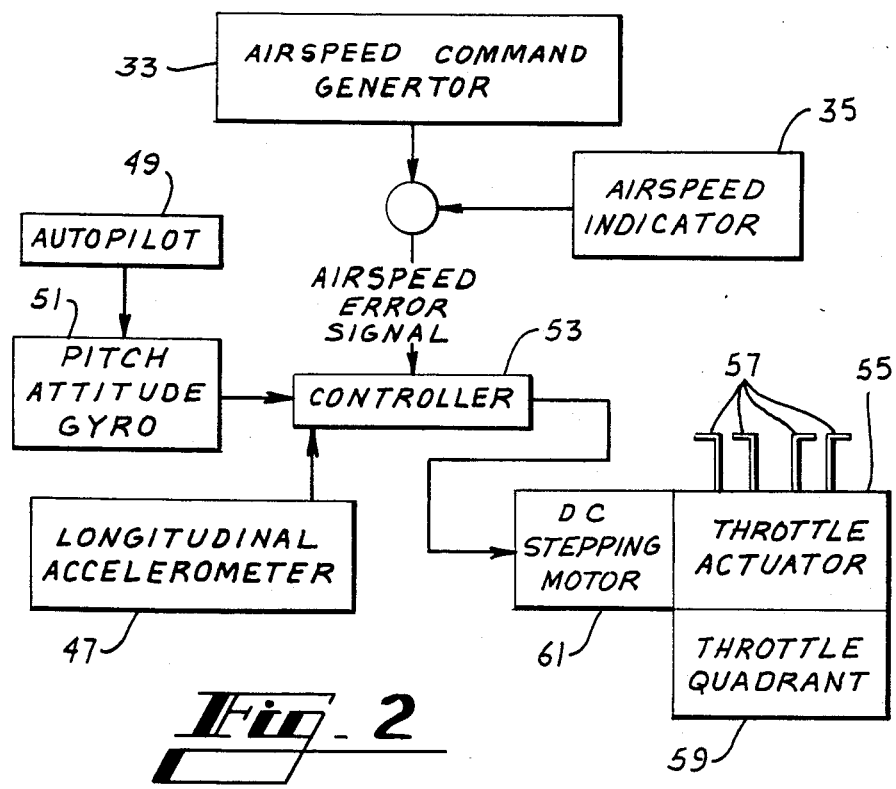
FIG. 2 is a block diagram illustrating the autothrottle system of the present invention wherein the use of feedback is eliminated.
Figure 3:
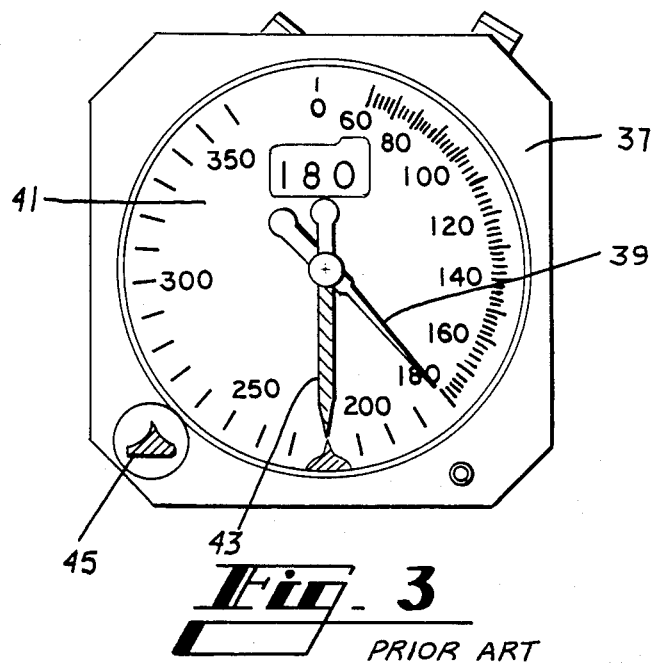
FIG. 3 illustrates the instrumentation of the airspeed command generator employed in practicing the present invention.

FIG. 2 illustrates the autothrottle system 31 of the present invention which eliminates the need for feedback loops. The system 31 provides a simple and efficient approach which is easily retrofitted to an aircraft originally constructed without autothrottle capabilities; however, includes an autopilot having a pitch attitude gyroscope.

The system 31 comprises an airspeed command generator 33 for inputting a desired airspeed setpoint. The generator 33 generates an airspeed error proportional to the difference between the actual airspeed, as measured by airspeed indicator 35, and the desired airspeed setpoint. This error signal is typically provided as a voltage having a specific value.

The airspeed command generator 33, preferably, comprises a maximum allowable airspeed indicator 37, Type 532-38105-200, with Remote Power and Airspeed Hold/Fast-Slow Error Module, Type 915-38106-001 produced by Intercontinental Dynamics Corporation, 170 Coolidge Ave., P. O. Box 81, Englewood, New Jersey 07631. The airspeed indicator 37 is a panel mounted instrument which provides airspeed, maximum allowable airspeed, and digital indicated airspeed on a composite instrument display. A white pointer 39 indicates airspeed against a fixed dial 41. A red and white striped pointer 43 indicates commanded airspeed.

A manually operated command bug is actuated by a knob 45 on the lower left corner of the indicator. The knob permits the pilot to set the desired command airspeed that will provide proper signals to the autothrottle system 31. Airspeed output error signals are determined by the difference between the airspeed pointer and the manually set command bug.

The Remote Power Supply, hereinafter referred to as the Error Module, provides input power to the indicator. It receives airspeed data from the indicator and in turn provides airspeed hold and airspeed fast/slow error output to the system 31. It also provides fast/slow and hold valid outputs at +28 Vdc.

A longitudinal accelerometer 47 comprises a component of the system 31 adapted to be retrofitted to an undedicated aircraft. The longitudinal accelerometer 47 is mounted in the aircraft to measure acceleration in the fore and aft direction of the aircraft's principal body axis. A voltage output is provided by the accelerometer 47 which is proportional to the force exerted on a slug free to move fore and aft along this principal axis. Thus, it is possible to input data indicating that the aircraft is slowing in speed or increasing in speed.

Pitch attitude data is provided to system 31 by pitch attitude gyroscope 51. Alternatively, the aircraft can already include an autopilot 49 having the pitch attitude gyroscope 51 to indicate when the aircraft is nose up or nose down. Then, it is a simple matter to patch this output into the retrofittable autothrottle system 31.

The airspeed error signal, longitudinal acceleration data, and pitch attitude data are inputted to a controller 53 which comprises, for example, a plurality of LSIC cards and a power supply. The controller 53 is provided with the control laws for the particular aircraft to be retrofitted with the autothrottle system 31. The controller 53 processes the inputted data in accordance with these control laws and provides an output command signal for slewing the throttle levers to the appropriate throttle setting.

It should be noted that when the aircraft experiences a positive pitch angle, i.e., nose up attitude, the gravitational force on the slug of the longitudinal accelerometer 47 is interpreted by the accelerometer 47 as a forward acceleration. However, since no reduction in power is desired due to the pitch-up alone, a compensating signal is introduced from the pitch attitude gyroscope 51. Additionally, builtin test software is included to automatically isolate any faults or failures at the circuit card lever of the controller 53.

The throttle setting command signal provided by controller 53 is received by a throttle lever actuator 55 for positioning at least one of the throttles 57 of throttle quadrant 59 in accordance with this command signal. The actuator 55 utilizes a D.C. stepping motor 61 to eliminate the need for feedback control in positioning the levers as will be explained in further detail hereinafter.

Figure 4A:
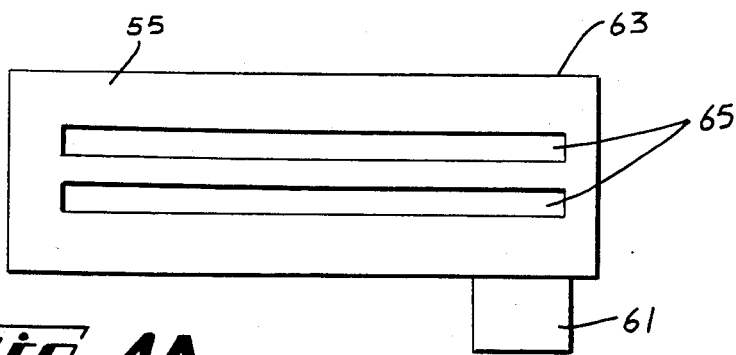
FIGS. 4A-4C illustrate the throttle lever actuator of the present invention.

Referring to FIG. 4A, the throttle lever actuator 55, having D.C. stepping motor 61, includes a low profile housing 63 provided with slots 65 for accommodating throttle levers 57. The housing 63 is mounted to the throttle quadrant 59 using existing screw holes and/or drilled pilot holes with positioning dowels and clamps. Removal of the autothrottle actuator 55 returns the aircraft to its original functional condition.

Figure 4B:
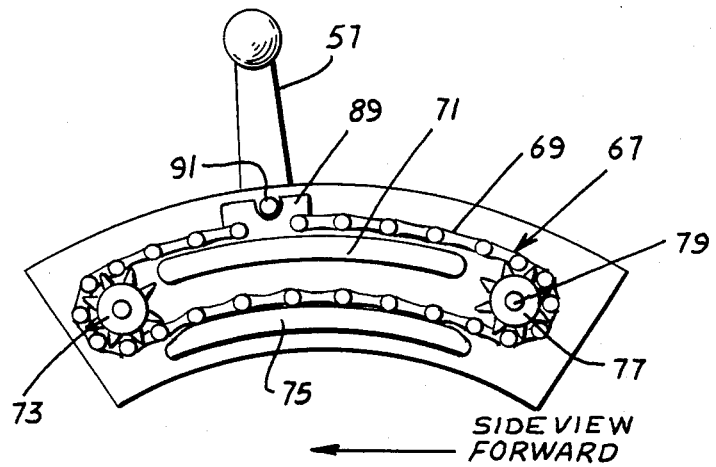
Figure 4C:
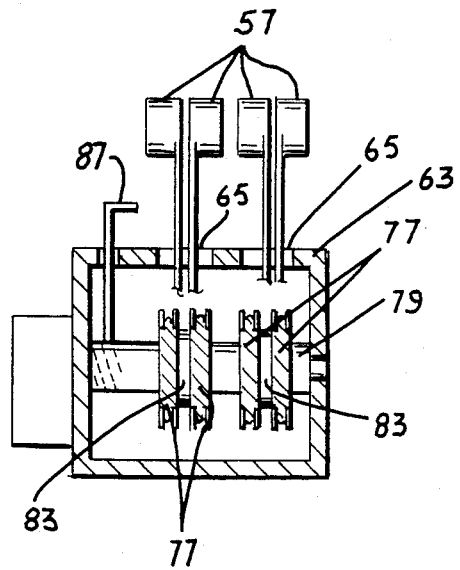

As shown in FIGS. 4B-4C each lever 57 is driven by a chain drive arrangement generally indicated at 67. Each chain drive arrangement 67 comprises a chain 69, the ends of the chain 69 being joined to form a continuous loop.

Each chain 69 follows the arc of a first curved support bar 71, passes down and around a first sprocket 73 at the front of actuator 55, the lower segment of the chain loop passing over a second curved support bar 75 concentric with the first bar 71. The chain 69 also engages a second sprocket 77 located and positioned at the rear of the actuator 55. The first sprockets 73 at the front of the actuator 55 are idlers, the second sprockets 77 are idlers in manual throttle operation, and are clutched to a drive shaft 79 during autothrottle operation.

The drive shaft 79 is driven by D. C. stepping motor 61, drive shaft 79 being selectively affixed to second sprockets 77 by slip clutches 83 as illustrated in FIG. 4C. Engagement of the clutches 83, and motor 61 are controlled by lever 87 conveniently located to the left of the throttle levers 57.

A notched carrier 89, best seen in FIG. 4B, attached to each chain 79, engages a pin 91 attached to the corresponding throttle lever 59. The notched carrier 89 engages pin 91 throughout the throttle range from flight idle to maximum power. When the throttle is retarded aft of flight idle, for ground operation, the throttle levers 57 are raised such that pin 91 disengages the notch of carrier 89, as is best seen in FIG. 5. Thus, during ground operation, the autothrottle automatically disengages and remains latched in place until throttle lever 57 is returned to flight idle.

Referring to FIG. 5, when throttle lever 57 is lifted by the pilot the engagement pin 91 is lifted from carrier latch 93. The compression spring 95, set by set screw 97, then seats the aft end of the carrier latch 93 into upper chain guide 71. This prevents chain movement (due to vibration or other) while the throttle is in the lifted position and assures that the carrier notch will be available when the engagement pin is returned to the carrier notch for normal flight use. Reinsertion of engagement pin 91 unlocks the carrier latch 93 so that the notched carrier can again move forward.

Each throttle lever 57 can be manually positioned during automatic operation of the autothrottle. This feature is accomplished by providing that each rear sprocket 77 is affixed to the drive shaft 79 by the slip clutches 83 which permits the pilot to manualy reposition any or all throttle levers 57.

While the invention has been particularly shown and described with reference to preferred embodiments thereof, it will be understood by those skilled in the art that various changes in form and detail may be made therein without departing from the spirit and scope of the invention as defined by the appended claims.

I claim:

1. An autothrottle system for an aircraft having a throttle quadrant having at least one throttle lever, each lever being provided with an aperture for accommodating a pin therethrough, and an airspeed indicator, said system comprising:
   (a) an airspeed command generator for inputting a desired airspeed setpoint and for generating an airspeed error signal proportional to the difference between the actual airspeed, as measured by the airspeed indicator and the desired airspeed setpoint;
   (b) a longitudinal accelerometer mounted in the aircraft for measuring acceleration in the fore and aft direction of the aircraft's principal body axis, said longitudinal accelerometer prividing an accelerometer output signal proportional to the longitudinal acceleration of the aircraft;
   (c) a pitch attitude gyroscope for prviding a pitch attitude output signal indicative of the pitch attitude of the aircraft;
   (d) a controller for receiving said airspeed error signal, said pitch attitude output signal, and said accelerometer output signal and for generating, based on the control laws for the aircraft, a throttle setting command signal; and
   (e) a throttle lever actuator for positining at least one of the throttle levers of the throttle quadrant in accordance with said throttle setting command signal without the need for feedback control in the positioning of at least one throttle lever, said throttle lever actuator comprising:
      (1) a low profile housing having slots for accommodating the throttle levers, said housing being adapted to fit on top of and be attached to the existing throttle quadrant;
      (2) a chain drive mechanism extending substantially along the length of said housing for driving each throttle lever individually, each of said chain drive mechanisms being selectively clutched to a drive shaft by means of a slip clutch;

(3) a D.C. stepping motor for receiving said throttle setting command signal and for driving said drive shaft in accordance with said command signal;

(4) a pin for insertion through the aperature provided in each of said throttle levers; and (5) a notched carrier attached to each chain drive mechanism for engaging each pin in the corresponding throttle lever to attach the lever to the corresponding chain drive mechanism.

2. An autothrottle system according to claim 1, wherein said airspeed command generator comprises a manuaally operated command bug which is actuated by a knob to permit a pilot to set a desired airspeed setpoint, said airspeed error signal being determined by the difference between the airspeed pointer of the airspeed indicator and said manually set command bug.

3. An autothrottle system according to claim 2, wherein the pitch attitude gyroscope provides a compensating signal to said controller when the aircraft experiences a change in pitch angle without attendant longitudinal acceleration.

4. An autothrottle system according to claim 3, wherein said airspeed error signal is a voltage.

5. An autothrottle system according to claim 4, wherein said longitudinal acceleration signal is a voltage.

6. An autothrottle system according ato claim 1, wherein said drive chain mechanism comprises:

(a) an endless loop chain extending substantially along the length of said hosuing;

(b) an idler sprocket at the front of said housing for engaging said chain;

(c) a sprocket at the rear of said housing for engaging said chain, said rear sprocket being an idler during manual operation of the throttle levers and being clutched to said drive shaft during automatic operation by means of said slip clutch;

(d) a first curved support bar for guiding the upper loop of said endless loop chain; and (e) a second curved support bar concentric with said first curved support bar for supporting the lower loop of said endless loop chain.

7. In an autothrottle system adapted to be retrofitted to an aircraft having a throttle quandrant including at least one throttle lever, each throttle lever having an aperture for accommodating a pin therethrough, a throttle lever actuator comprising:

(a) a low profile housing having slots for accommodating the throttle levers, said housing being adapted to fit on top of and be attached to the existing throttle quandrant;

(b) a chain drive mechanism for driving each throttle lever individually, each chain drive mechanism being selectively clutched to a drive shaft by means of a slip clutch;

(c) a D.C. stepping motor for driving said drive shaft;

(d) a pin for insertion through the aperture provided in each of said throttle levers;

(e) a notched carrier attached to each of said drive chain mechanisms for engaging each pin in a corresponding throttle lever to attach the lever to the corresponding chain drive mechanism.

8. An autothrottle system according to claim 7, wherein said chain drive mechanism comprises:

(a) an endless loop chain extending along the length of said low profile housing;

(b) an idler sprocket at the front of said housing for engaging said chain;

(c) a sprocket at the rear of said housing for engaging said chain, said rear sprocket being an idler during manual operation of the throttle levers and being selectively clutched to said drive shaft by a slip clutch during automatic operation;

(d) a first curved support bar for guiding the upper loop of said endless chain, and (e) a second curved support bar, concentric with said first curved bar for supporting the lower loop of said endless loop chain.

* * * * *